US012115568B2

United States Patent

(12) United States Patent
Fugate et al.
(10) Patent No.: US 12,115,568 B2
(45) Date of Patent: Oct. 15, 2024

(54) NARROW ZONE PILOT CONTROLLED LIQUID ACTUATED COOLANT CONTROL VALVE

(71) Applicant: US Controls Acquisition, Ltd., Erie, PA (US)

(72) Inventors: Jeffrey R. Fugate, Beloit, OH (US); Rodney W. Christensen, Salem, OH (US); Desmond J. McDonald, Erie, PA (US)

(73) Assignee: US Controls Acquisition, Ltd., Erie, PA (US)

( * ) Notice: Subject to any disclaimer, the term of this patent is extended or adjusted under 35 U.S.C. 154(b) by 0 days.

(21) Appl. No.: 18/113,361

(22) Filed: Feb. 23, 2023

(65) Prior Publication Data

US 2023/0278086 A1 Sep. 7, 2023

Related U.S. Application Data

(63) Continuation-in-part of application No. 15/367,489, filed on Dec. 2, 2016, now abandoned.

(51) Int. Cl.

| | |
|---|---|
| ***B21B 27/10*** | (2006.01) |
| ***B05B 1/02*** | (2006.01) |
| ***B05B 1/20*** | (2006.01) |
| ***B05B 1/30*** | (2006.01) |
| *B21B 3/00* | (2006.01) |

(52) U.S. Cl.
CPC ................ *B21B 27/10* (2013.01); *B05B 1/02* (2013.01); *B05B 1/20* (2013.01); *B05B 1/3013* (2013.01); *B21B 2003/001* (2013.01); *B21B 2027/103* (2013.01)

(58) Field of Classification Search
CPC .............. B21B 27/10; B21B 2003/001; B21B 2027/103; B05B 1/02; B05B 1/20; B05B 1/3013
USPC .... 239/88, 585.1–585.5, 566, 565, 551, 550
See application file for complete search history.

(56) References Cited

U.S. PATENT DOCUMENTS 5,071,072 A * 12/1991 Baun .................. B21B 45/0233 251/30.01
2006/0243828 A1* 11/2006 Angelone ............... F16L 41/03 239/207

* cited by examiner

*Primary Examiner* — Christopher S Kim
(74) *Attorney, Agent, or Firm* — The Webb Law Firm

(57) ABSTRACT

A wire block assembly cartridge for an arrangement of solenoid operated pilot valves for operating coolant control valves in a manifold assembly for supplying a pressurized coolant to a rolling mill and having multiple wire block blocks in the manifold. The cartridge has four coolant control valves and four solenoids coils that control the four coolant control valves, and four spray nozzles. The wire block assembly cartridge can have the spray nozzles on 25 mm centers to enable spraying in narrow zones.

8 Claims, 5 Drawing Sheets

FIG. 4
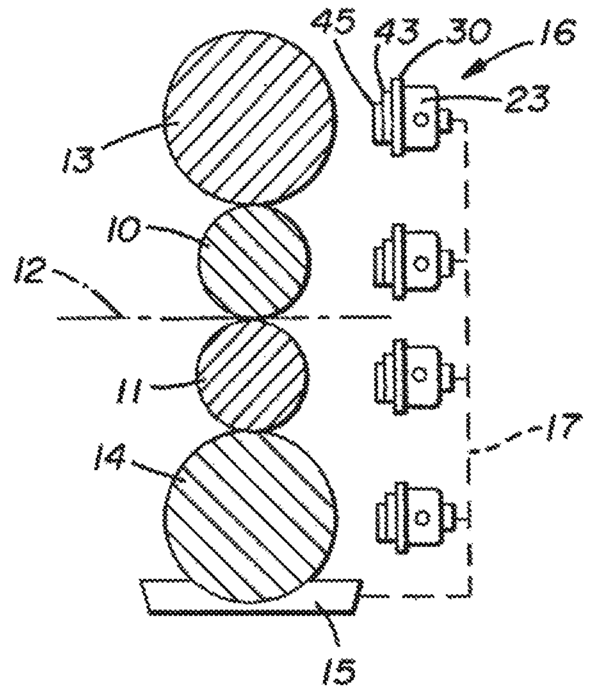
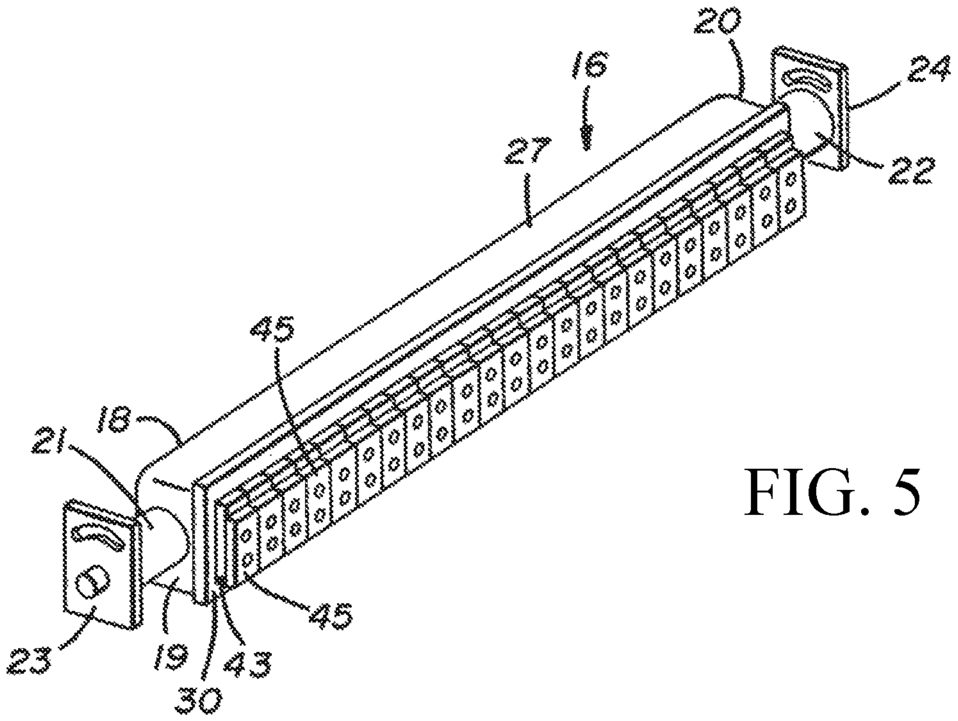
FIG. 5

NARROW ZONE PILOT CONTROLLED LIQUID ACTUATED COOLANT CONTROL VALVE

CROSS-REFERENCE TO RELATED APPLICATIONS

The present application claims priority to U.S. patent application Ser. No. 15/367,489, entitled "Narrow Zone Pilot Controlled Liquid Actuated Coolant Control Valve", filed Dec. 2, 2016, the entire disclosure of which is hereby incorporated by reference in its entirety.

BACKGROUND OF THE INVENTION

1. Technical Field

This invention relates to rolling mills in general and more particularly to rolling mills where aluminum is being reduced to thin gauge sheets and still more particularly to coolant applying devices for said rolling mills. In addition it relates to spraying of narrow areas

2. Description of the Prior Art

Prior coolant applying devices used on rolling mills have arranged elongated manifolds parallel with the work and backup rolls of the rolling mill and directed fluids, such as kerosene, through individual spray nozzles on the manifolds against the rolls of the mills to provide temperature control and lubrication during the rolling operation.

The prior art includes U.S. Pat. No. 4,568,026 of Feb. 4, 1986; U.S. Pat. No. 4,733,696 of Mar. 29, 1988, and U.S. Pat. No. 4,733,697 of Mar. 29, 1988, in which pilot operated control valves in manifold assemblies are disclosed and in which the coolant control valves controlling the spray nozzles are removable cartridge-like assemblies positioned in the coolant manifold and controlled by solenoid actuated pilot valves in the cartridge assemblies or immediately adjacent thereto.

The pilot operated coolant control valves of these patents have been very successful commercially and widely adopted by the rolling mill operators primarily concerned with rolling aluminum.

The location of the solenoid actuated pilot valves in the cartridge assemblies or immediately adjacent thereto and the coolant fluid, usually kerosene, subjects these prior art solenoid actuated pilot valves to the likelihood of damage and malfunction and the possibility of fire in the event of failure in the electrical energizing systems and/or the solenoid coils, etc. thereof.

U.S. Pat. No. 5,071,072 allows for the positioning point of use control of coolant valves and reducing the cost and complexity of installation and repair time normally required, as for example in my earlier U.S. Pat. No. 4,733,639, by eliminating dependence on an air supply and communication channels by which the solenoid actuated pilot valves controlled the operation of the coolant control valves and substituting a simple control of pressurized coolant for actuating the same. However, the invention shown in U.S. Pat. No. 5,071,0172 only allowed for use in zones other than narrow zones and did not allow for a flow rate below 75 lprn.

SUMMARY OF THE INVENTION

This invention relates to a wire block assembly cartridge for an arrangement of solenoid operated pilot valves for operating coolant control valves in a manifold assembly for supplying a pressurized coolant to a rolling mill and having multiple wire block blocks in the manifold. The cartridge has four coolant control valves and four solenoids coils that control the four coolant control valves, and four spray nozzles. The wire block assembly cartridge can have the spray nozzles on 25 mm centers to enable spraying in narrow zones. The wire block assembly cartridge can produce a flow rate of 38 lpm. The wire block assembly cartridge can have the solenoid coils staggered and not aligned.

This invention also provides for a method for replacing a malfunctioning piece in a wire block assembly cartridge having a flow rate below 40 lpm for narrow zones for an arrangement of solenoid operated pilot valves for operating coolant control valves in a manifold assembly for supplying a pressurized coolant to a rolling mill and having multiple wire block blocks in the manifold. The method includes: (a) determining which cartridge has a malfunctioning piece; (b) removing fasteners that retain the cartridge to the block assembly (c) removing the cartridge; (d) locating the malfunction piece; € replacing the malfunctioning piece; (f) inserting the cartridge; and (f) fastening the cartridge to the block assembly

BRIEF DESCRIPTION OF THE DRAWINGS

FIG. 4 is a symbolic illustration of a pair of work rolls and associated backup rolls of a rolling mill with a fluid collecting trough therebelow and several fluid spraying manifold assemblies therebeside.

FIG. 5 is a perspective elevation of a plurality of coolant control valves in a manifold assembly.

DETAILED DESCRIPTION OF THE PREFERRED EMBODIMENT

Figure 1:
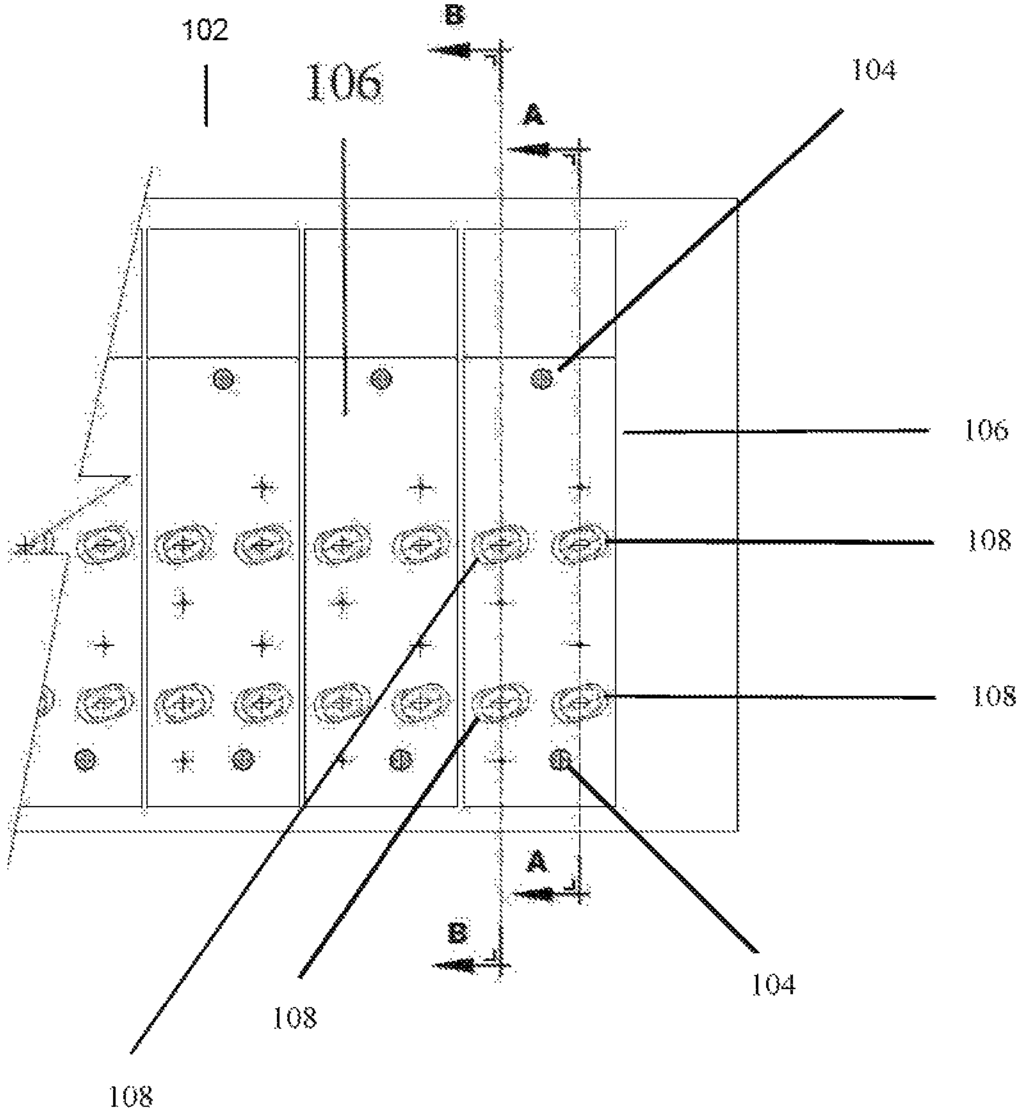
FIG. 1 is front plan view of on an enlarged scale of a portion of a portion of a plurality of coolant control valves on a manifold assembly.

FIG. 1 shows a section of a coolant valve manifold assembly 102. The coolant valve manifold assembly 102 has fasteners 104 that hold nozzle plate 106 in place. Four spray nozzles 108 are exposed to spray narrow zones.

Figure 2:
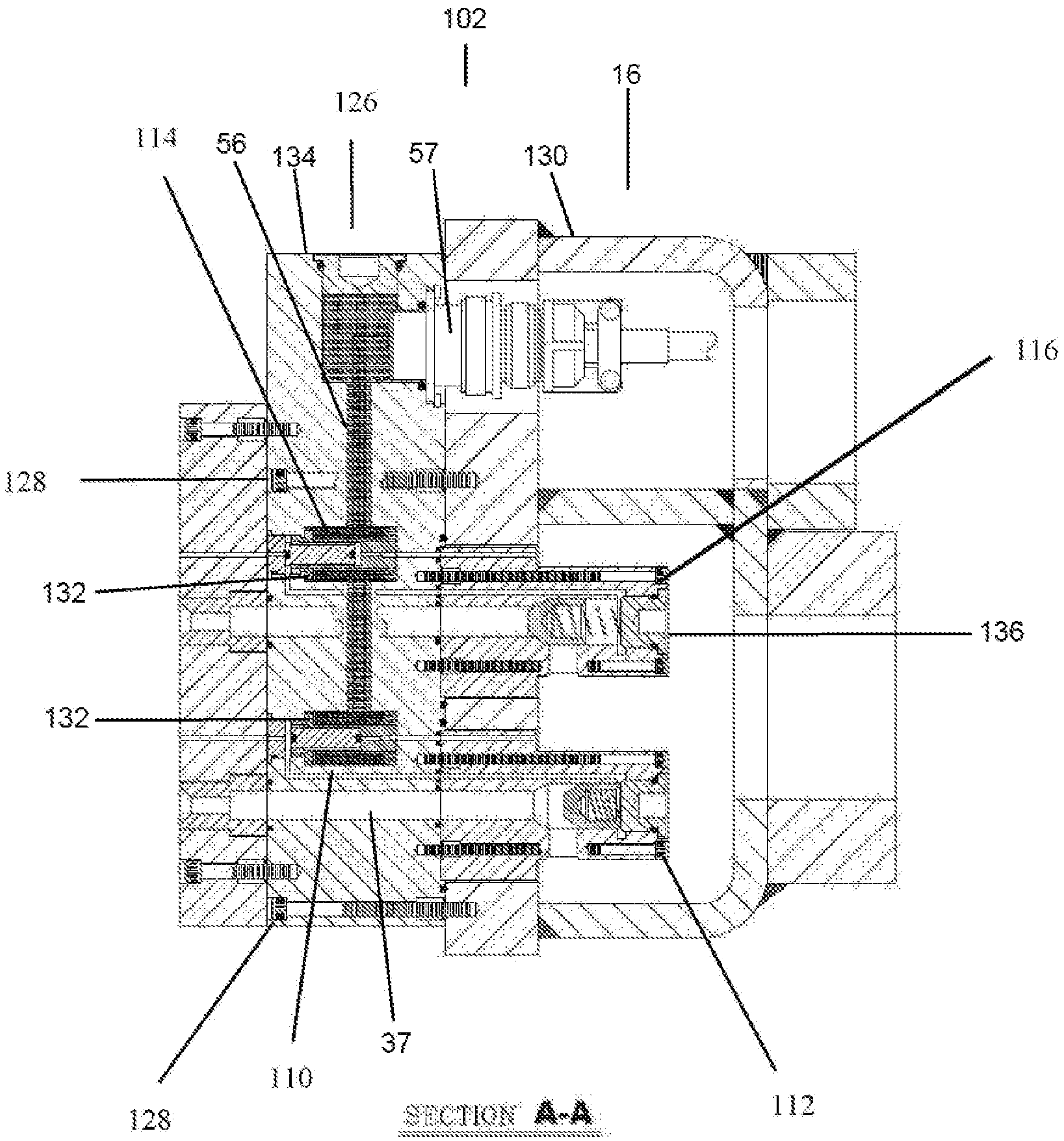
FIG. 2 is an enlarged cross sectional elevation transversely of the control valve along lines A-A of FIG. 1.

FIG. 2 shows the coolant valve manifold assembly 102 having a header manifold 130 in section lines A-A. A first of four solenoid coils 110 with a solenoid valve 132 that controls a first of four coolant control valves 112. A second of four solenoid coils 114 with a solenoid valve 132 that controls a second of four coolant control valves. Coolant control valves are located within a poppet cartridge 116 having a poppet cartridge housing 136.

Figure 3:
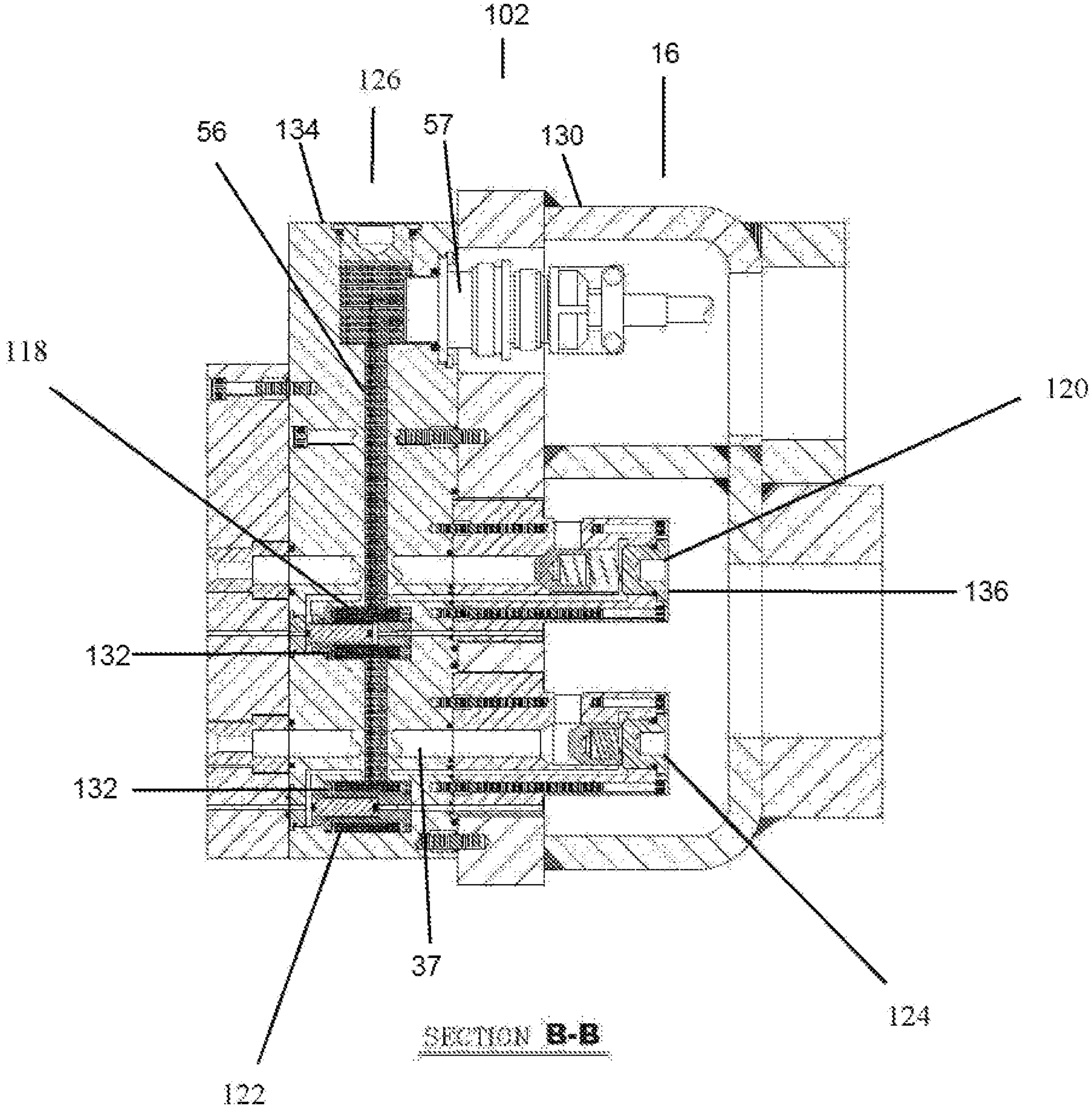
FIG. 3 is an enlarged cross sectional elevation transversely of the control valve along lines B-B of FIG. 1.

FIG. 3 shows the coolant valve manifold assembly 102 having a header manifold 130 in section lines B-B. A third of four solenoid coils 118 with a solenoid valve 132 that controls a third of four coolant control valves. A fourth of four solenoid coils 122 with a solenoid valve 132 that controls a fourth of four coolant control valves 124. Coolant control valves are located within a poppet cartridge 120 having a poppet cartridge housing 136.

Wire block assembly cartridge 126 having a rectangular block housing 134 is shown in FIGS. 2&3. The wire block assembly cartridge 126 allows for easy front access to solenoid coils 110, 114, 118, 122 and the coolant control valves 112 and 124 within the poppet cartridge 116 and 120.

If a part is malfunctioning, fasteners 104 can be removed from nozzle plate 106. Once nozzle plate 106 is removed, fasteners 128 can be removed. After fasteners 128 are removed, wire block assembly 126 can be removed. This allows for easy access to and replacement of any malfunctioned parts. From wire block assembly 126 solenoid coils 110, 114, 118, 122 and the coolant control valves 112 and 124 are easily accessible.

By referring to FIG. 4 of the drawings, it will be seen that a diagrammatic illustration of a rolling mill discloses superimposed work rolls 10 and 11 engaged on a pass line 12 and having backup rolls 13 and 14 as will be understood by those skilled in the art. Such rolling mills are used in reducing metal billets to continuous hot or cold rolled strip and/or sheet. Means for driving the rolls is not illustrated.

A coolant collection trough 15 is shown and four vertically spaced coolant control valve manifold assemblies 16 are shown positioned in spaced relation to the work rolls 10 and 11 and the backup rolls 13 and 14. Means for circulating a coolant fluid, such as kerosene, from the collecting trough 15 to the manifold assemblies 16 is indicated by broken lines 17.

By referring to FIG. 5 of the drawings, a perspective elevation of one of the coolant valve manifold assemblies 16 may be seen without the narrow zone valves of the current invention. It is formed of an elongated housing 18 closed at its ends 19 and 20 and provided with end extensions 21 and 22 including mounting and adjustment plates 23 and 24.

Figure 6:
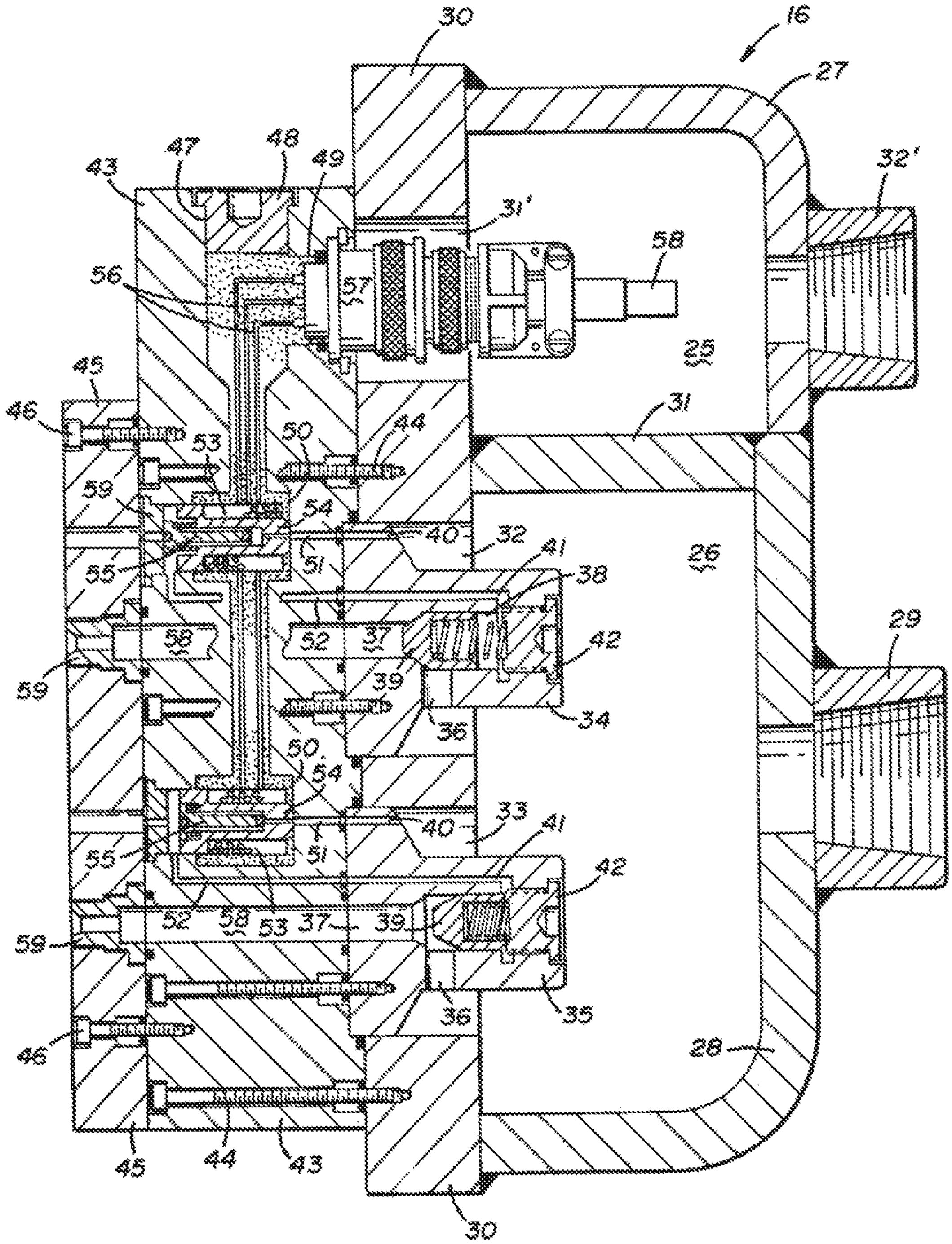
FIG. 6 Prior Art
FIG. 6 is an enlarged cross sectional elevation transversely of a prior art control valve and manifold assembly with parts broken away and parts in cross section and illustrating the fluid control valves in normally closed position.

By referring now to FIG. 6 of the drawings, it will be seen a prior art pilot controlled liquid actuated coolant control valve have two coils. The housing 18 forms two elongated chambers 25 and 26, respectively, which are formed by upper and lower cross sectionally L-shaped body members 27 and 28, respectively. Inlet ports 29 communicate with the elongated chamber 26 for the introduction of liquid coolant thereinto, such as kerosene, from a suitable supply source at operating pressures which may vary between 30 and 200 PSI. The elongated chambers 25 and 26 are closed by a vertically positioned body member 30 and the chambers 25 and 26 are separated by a horizontal partition 31. The body members 26 and 27 and 30 and 31 are secured to one another by welding.

Still referring to FIG. 6 of the drawings, it will be observed that the vertically positioned body member 30, which extends continuously along the elongated chambers 25 and 26 and forms one wall thereof, has a plurality of openings therein comprising a horizontally disposed row of openings 31' which communicate with the elongated chamber 25 and two vertically spaced rows of openings 32 and 33, respectively, the openings 32 and 33 being in vertical alignment and in communication with the elongated chamber 26 in which the pressurized fluid coolant is maintained. Two rows of coolant control valves 34 and 35, respectively, are positioned in the rows of openings 32 and 33, respectively, and each of the coolant control valves 34 has an inlet port 36 and an outlet port 37 which communicate with a valve chamber 38 in which a spring urged valve element 39 is reciprocably positioned so as to control fluid flowing between the inlet port 36 and the outlet port 37. Each of the coolant control valves 34 also has a pair of communication passageways 40 and 41, the passageway 40 communicating with the pressurized coolant in the elongated chamber 26 and the passageway 40 establishing communication with the valve chamber 38. Both the communicating passageways 40 and 41 extend to the surface of the coolant control valve 34 oppositely disposed with respect to the elongated channel 26. Each of the coolant control valves 35 are duplicates of the coolant control valves 34 and have the same inlet and outlet ports 36 and 37, the same valve chamber 38, valve elements 39 and the communicating passageways 40 and 41 as hereinbefore described in connection with the coolant control valves 34. Each of the coolant control valves 34 and 35 has a plugged opening 42 so that the valve chambers 38 directly communicate with the fluid coolant in the elongated chamber 26 only through the inlet ports 36.

Still referring to FIG. 6 of the drawings, it will be seen that a pilot valve mounting body 43 is attached to the vertically positioned body member 30 by a plurality of fasteners 44 and that a nozzle plate assembly 45 is mounted on the pilot valve mounting body 43 by a plurality of fasteners 46.

The pilot valve mounting body 43 has a vertical bore 47 therein which is plugged at its upper end by a plug 48 above a sideward extension 49 which communicates with one of the openings 31 in the horizontally disposed row of openings communicating with the elongated chamber 25. The vertical bore 47 extends downwardly in the pilot valve mounting body 43 so as to communicate with two cavities 50 which in turn communicate with passageways 51 and 52, the passageways 51 communicating with the communicating passageways 40 in the coolant control valves 34 and 35 and the passageways 52 communicating with the passageways 41 in the coolant control valves 34 and 35.

Solenoid coils 53 positioned around sleeves 54 containing longitudinally slotted solenoid plungers 55 are disposed in each of the cavities 50 in the pilot valve mounting body 43 and are connected with electrical conductors 56 which extend through the vertical bore 47 and in turn connect with an electrical connection plug 57 in each of the openings 31 in the horizontally disposed row of such openings which communicate with the elongated chamber 25 which forms a raceway for cables 58 which lead to the access ports 32' and to a suitable power source and control switches as hereinbefore described. The solenoids are encapsulated in resin.

The cavities 50 are closed by plugs 59 which are centrally apertured and sealingly engaged in the cavities 50 in spaced relation to the ends of the sleeves 54 so as to form chambers 60 therebetween. The adjacent ends of the sleeves 54 have enlarged circular areas therein which in effect enlarge the chambers 60. The longitudinally slotted solenoid plungers 55 have enlarged ends 61 which are movable into and out of the enlarged areas in the ends of the sleeves 54. Coil springs are disposed around the adjacent portions of the longitudinally slotted solenoid plungers 55 so as to engage the enlarged ends 61 and the opposing surfaces of the enlarged areas in the sleeves 54 so as to urge the longitudinally slotted solenoid plungers 55 outwardly of the solenoid coils 53 when the solenoids are de-energized. The longitudinally slotted solenoid plungers 55 have secondary valve elements comprising resilient seals in each of their opposite ends, one of which will engage and close the aperture in the center of the plug 59 when the solenoid is de-energized and the other of which will engage and close the passageway 51 which extends through the pilot valve mounting body 43 and the adjacent end portion of the longitudinally slotted solenoid plunger 55. When the solenoid plunger 55 is in the position illustrated in the upper portion of FIG. 3 of the drawings, fluid pressure from the elongated chamber 26 in which the pressurized coolant fluid is present will flow through the communicating passageway 40 in the coolant control valve 34, the passageway 51 in the pilot valve mounting body 43 and through the communicating passageway in the end of the sleeve 54 and then through the longitudinal slots in the surface of the solenoid plunger 55 and into the chamber 60 from whence it will flow through the passageway 52 in the pilot valve mounting body 43 and the communicating passageway 41 in the coolant control valve 34 and into the valve chamber 38 where it will move the valve element 39 into closed position with respect to the outlet port 37 thus stopping the flow of coolant.

It will be understood by those skilled in the art that when the solenoid coil 53 is energized, the longitudinally slotted solenoid plungers 55 will move inwardly of the sleeves 54 within the solenoid coils 53 and as illustrated in the lower one of the solenoid operated pilot valves in FIG. 3 of the drawings, will move the seal in its inner end against the passageway in the adjacent end of the sleeve 54 and effectively close communication with the passageway 51 in the pilot valve mounting body and the passageway 40 in the coolant control valve 35. When this occurs, the pressurized coolant in the elongated chamber 26 and the inlet port 36 of the coolant control valve 35 will move the valve element 39 by reason of its end configuration exposed to the inlet port 36 whereupon the pressurized coolant from the elongated chamber 26 will flow through the outlet port 37 and into a communicating outlet port passageway 58 in the pilot valve mounting body 43 which in turn communicates with a spray nozzle 59 mounted in the nozzle plate assembly 45. Those skilled in the art will observe that each of the two spray nozzles in each of the plurality of nozzle plate assemblies 45 as seen in FIG. 5 of the drawings, in each of the manifolds and its valve assemblies of FIG. 4 of the drawings, are thus subject of instantaneous remote control by reason of the solenoid operated pilot valves controlling the fluid pressure operation of the coolant control valves as hereinbefore described.

It will also be seen that in the form of the invention illustrated in FIG. 6 of the drawings and hereinbefore described, the normally closed design results in a failsafe operation in the event of electrical failure in the control system as the springs around the ends of the longitudinally slotted solenoid plungers 55 will upon de-energization of the solenoid, close the communication passageways between the pressurized coolant in the elongated chamber 26 with respect to the coolant control valves and their valve elements 39, which responsive to springs 60 will immediately close the valve elements 39 with respect to the inlet ports 36.

Those skilled in the art will also observe that such automatic closure of the solenoid operated pilot valves and the resulting closure of the coolant control valves, eliminates flow of flammable coolant fluid, such as kerosene, through the solenoid operated pilot valves and greatly reduces the chances of fire in an adjacent rolling mill and in proximity to the device of the invention as would otherwise occur.

It will occur to those skilled in the art that the design of the disclosed invention may be modified so that the coolant control valves are normally open as may be desirable in some rolling mill applications wherein it is essential that a continuous supply of coolant fluid and its capability of providing lubrication between the work rolls and the material being rolled continue to prevent damage to the material being rolled as well as the work rolls and backup rolls, etc. This is particularly true in continuous rolling mill installations.

It will thus be seen that substantially improved pilot controlled liquid operated coolant control valves in a manifold assembly have been disclosed, illustrated and described, it will be apparent to those skilled in the art that various changes and modifications may be made therein without departing from the spirit of the invention or from the scope of the claims.

What is claimed is:

1. A valve assembly configured to be removeably attached by fasteners to a header manifold, the valve assembly comprising:

(a) a wire block having:
  (i) a rectangular block housing having a top portion, a bottom portion, and an opening,
  (ii) an electrical connection in the top portion of the rectangular block housing,
  (iii) four solenoid valves within the rectangular block housing located underneath the electrical connection, and
  (iv) four solenoid coils within the rectangular block housing, each of the four solenoid coils connected to one of the four solenoid valves, the four solenoid coils in connection with one or more electrical conductors and connected to the electrical connection; and
(b) a poppet cartridge having:
  (i) two coolant control valves,
  (ii) a poppet cartridge housing designed to fit within the opening of the rectangular block housing and to releasably attach to the wire block, and
  (iii) two outlet ports each extending from one of the coolant control valves, wherein when the poppet cartridge is connected to the wire block and the header manifold, each coolant control valve is connected to one of the solenoid valves, and wherein each of the two outlet ports is designed to align with any two spray nozzles in a nozzle plate.

2. The valve assembly as recited in claim 1, wherein at least two of the spray nozzles are spaced apart at 25 mm intervals from a center of the nozzle plate.

3. The valve assembly as recited in claim 1, wherein the spray nozzles have a flow rate of 38 lpm.

4. The valve assembly as recited in claim 1, wherein the four solenoid coils are staggered and not aligned.

5. A valve assembly configured to be removeably attached by fasteners to a header manifold, the valve assembly comprising:

(a) a plurality of wire blocks, each wire block having:
  (i) a rectangular block housing having a top portion, a bottom portion, and an opening,
  (ii) an electrical connection in the top portion of the rectangular block housing,
  (iii) four solenoid valves within the rectangular block housing located underneath the electrical connection, and
  (iv) four solenoid coils within the rectangular block housing, each of the four solenoid coils connected to one of the four solenoid valves, the four solenoid coils in connection with one or more electrical conductors and connected to the electrical connection; and
(b) a plurality of poppet cartridges, each poppet cartridges having:
  (i) two coolant control valves, (ii) a poppet cartridge housing designed to fit within the opening of the rectangular block housing and to releasably attach to one of the plurality of wire blocks, and (iii) four outlet ports each extending from one of the coolant control valves, wherein when one of the plurality of poppet cartridges is connected to one of the plurality of wire blocks and the header manifold, each coolant control valve is connected to one of the solenoid valves, and wherein each of the four outlet ports is designed to align with any two spray nozzles in a nozzle plate.

6. The valve assembly as recited in claim 5, wherein at least two of the spray nozzles are spaced apart at 25 mm intervals from a center of the nozzle plate.

7. The valve assembly as recited in claim 5, wherein the spray nozzles have a flow rate of 38 lpm.

8. The valve assembly as recited in claim 5, wherein the four solenoid coils are staggered and not aligned.

* * * * *